United States Patent [19]

Iwamoto et al.

[11] Patent Number: 5,790,520
[45] Date of Patent: Aug. 4, 1998

[54] PATH PROTECTION SWITCH RING SYSTEM FOR LINE SAVING EVEN THOUGH LINE SETTING OPERATION WAS NOT CARRIED OUT

[75] Inventors: Koji Iwamoto; Akihiko Oka, both of Kawasaki, Japan

[73] Assignee: Fujitsu Limited, Kanagawa, Japan

[21] Appl. No.: 739,278

[22] Filed: Oct. 29, 1996

Related U.S. Application Data

[63] Continuation of Ser. No. 216,138, Mar. 21, 1994, abandoned.

[30] Foreign Application Priority Data

Sep. 20, 1993 [JP] Japan .................................. 5-233446

[51] Int. Cl.[6] .................................................. H04J 3/14
[52] U.S. Cl. .................................. 370/223; 370/228
[58] Field of Search .................................. 370/222, 223, 370/224, 225, 227, 228, 242, 16, 16.1, 85.12; 371/8.1, 8.2, 11.1, 11.2; 455/8

[56] References Cited

U.S. PATENT DOCUMENTS

| | | | |
|---|---|---|---|
| 4,593,154 | 6/1986 | Takeda et al. | 370/224 |
| 5,081,619 | 1/1992 | Nagata | 370/217 |
| 5,187,706 | 2/1993 | Frankel et al. | 370/217 |
| 5,218,600 | 6/1993 | Schenkyr et al. | 370/217 |
| 5,311,501 | 5/1994 | Takatsu | 370/357 |
| 5,317,198 | 5/1994 | Husbands | 370/222 |
| 5,446,725 | 8/1995 | Ishiwatari | 370/222 |
| 5,533,006 | 7/1996 | Uchida | 370/222 |

*Primary Examiner*—Min Jung
*Attorney, Agent, or Firm*—Helfgott & Karas, P.C.

[57] ABSTRACT

A path protection switch ring system has a working line, a protection line, and a plurality of add/drop multiplexers. The add/drop multiplexer has a path-switch unit, an unequipped signal detection unit, and a path-switch control unit. The path-switch unit is used to switch between the working line and the protection line. The unequipped signal detection unit is used to detect an unequipped signal which is output when line setting has not been carried out. The path-switch control unit is used to control the switching operation of the path-switch unit when the unequipped signal is detected.

17 Claims, 3 Drawing Sheets

PATH PROTECTION SWITCH RING SYSTEM FOR LINE SAVING EVEN THOUGH LINE SETTING OPERATION WAS NOT CARRIED OUT

This is a continuation of application Ser. No. 08/216,138, filed Mar. 21, 1994 now abandoned.

BACKGROUND OF THE INVENTION

1. Field of the Invention

The present invention relates to a line saving technology in a path protection switch ring system, and more particularly, to a line saving technology in a path protection switch ring system in a SONET (Synchronous Optical Network) or an SDH (Synchronous Digital Hierarchy) network.

2. Description of the Related Art

Recently, in the path protection switch ring system for a SONET or an SDH network, a working line and a protection line are provided. In this path protection switch ring system, when trouble such an accident, device trouble, or construction work occurs on one line (the working line), the other line (the protection line) is automatically selected and used.

However, in the path protection switch ring system, for example, when a line setting operation is not carried out, the line (working line) cannot be saved. Therefore, a path protection switch ring system which can automatically save a working line, even though a line setting operation was not carried out, is required.

SUMMARY OF THE INVENTION

An object of the present invention is to provide a path protection switch ring system which can be used without stopping the system, by automatically switching a working line to a protection line, when an operator forgets a line setting operation or when an unexpected situation occurs.

According to the present invention, there is provided a path protection switch ring system having a working line, a protection line, and a plurality of add/drop multiplexers, wherein the add/drop multiplexers comprises a path-switch unit for switching between the working line and the protection line; an unequipped signal detection unit for detecting an unequipped signal which is output when line setting is not carried out; and a path-switch control unit for controlling the switching operation of the path-switch unit when the unequipped signal is detected. Note that the unequipped signal (unequipped code: concretely, which is a signal where all bits are "0") is output when a line setting operation is not carried out.

Further, according to the present invention, there is also provided a line saving method for a path protection switch ring system having a working line, a protection line, and a plurality of add/drop multiplexers, wherein the line saving method comprises the steps of detecting an unequipped signal which is output when a line setting is not carried out; and changing from the working line to the protection line when the unequipped signal is detected. The path protection switch ring system may comprise a working line, a protection line, and a plurality of add/drop multiplexers wherein the add/drop multiplexers includes a path-switch unit for switching between the working line and the protection line; an unequipped signal detection unit for detecting an unequipped signal which is output when a line setting is not carried out; and a path-switch control unit for controlling the switching operation of the path-switch unit when the unequipped signal is detected.

The path protection switch ring system may be used in a synchronous optical network or a synchronous digital hierarchy network. The unequipped signal detection unit may be provided for each east and west side of the add/drop multiplexer, respectively.

The add/drop multiplexer may further comprise an alarm indication signal detection unit for detecting an alarm indication signal which is output when a trouble occurs on the working line or the protection line. The alarm indication signal detection unit may be provided for each east and west side of the add/drop multiplexer, respectively. The unequipped signal detection unit may be provided in parallel with the alarm indication signal detection unit, and the path-switch control unit may be controlled by the logical sum of outputs of the unequipped signal detection unit and the alarm indication signal detection unit.

The path-switch control unit may be determined to be a synchronous transport signal path-switch circuit, and the unequipped signal detection unit may detect a synchronous transport signal path unequipped signal. The path-switch control unit may be determined to be a virtual tributary path-switch circuit, and the unequipped signal detection unit may detect a virtual tributary path unequipped signal.

BRIEF DESCRIPTION OF THE DRAWINGS

The present invention will be more clearly understood from the description of the preferred embodiments as set forth below with reference to the accompanying drawings, wherein.

DESCRIPTION OF THE PREFERRED EMBODIMENTS

For a better understanding of the preferred embodiments, the problems of the prior art will be explained, with reference to FIGS. 1 and 2.

Recently, in communication fields, optical synchronization is used, and a standard system such as SONET or SDH has been realized. In a path protection switch ring system in a SONET or an SDH network, when a fiber is cut by an accident, device-trouble, construction work, or the like, an AIS (Alarm Indication Signal) is output, and a path-switch operates so as to select the other line, by an emergency method called "1:1".

Figure 1:
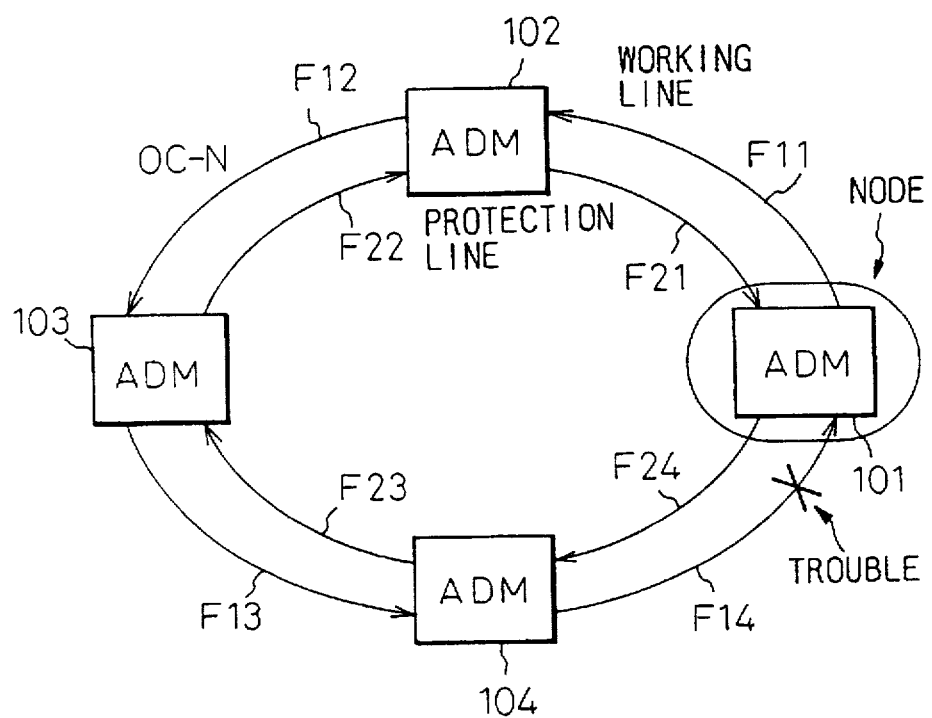
FIG. 1 is a diagram schematically showing an example of a path protection switch ring system in a synchronous optical network (SONET)

FIG. 1 shows an example of a path protection switch ring system in a synchronous optical network (SONET). In FIG. 1, reference numerals 101, 102, 103, and 104 denote ADMs (add/drop multiplexers) corresponding to nodes, F11, F12, F13, and F14 denote working optical fibers, and F21, F22, F23, and F24 denote protection optical fibers.

As shown in FIG. 1, for example, the path protection switch ring system of the SONET comprises an anticlockwise working line (working transmission line) and a clockwise protection line (protection transmission line). The working line is constituted by connecting the ADMs 101, 102, 103, 104 and the optical fibers F11, F12, F13, F14, and the protection line is constituted by connecting the ADMs 101, 102, 103, 104 and the optical fibers F21, F22, F23, F24. Note that in the path protection switch ring system, an anticlockwise working line is generally used.

Figure 2:
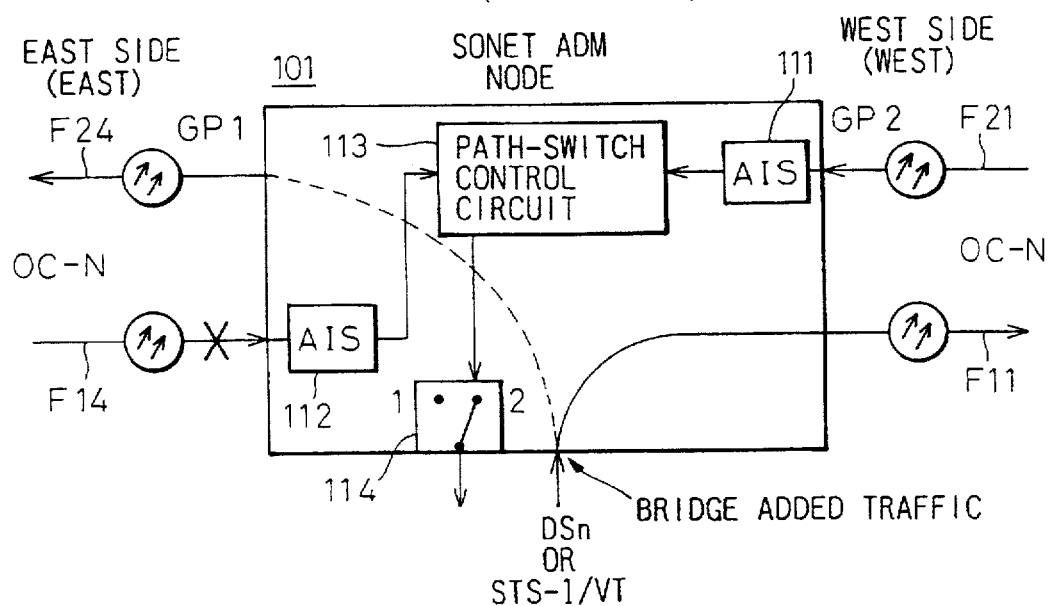
FIG. 2 is a block diagram schematically showing a configuration of an add/drop multiplexer (ADM) in order to explain an operation of the path protection switch ring system shown in FIG. 1.

FIG. 2 shows a configuration of an ADM in order to explain an operation of the path protection switch ring system shown in FIG. 1. In FIG. 2 reference numerals 111 and 112 denote AIS (Alarm Indication signal) detection circuits, 113 denotes a path-switch control circuit, and 114 denotes a path-switch.

As shown in FIGS. 1 and 2, in general service conditions, the anticlockwise working line having the optical fibers F11, F12, F13, F14 is used. For example, when a trouble or accident (for example, cutting of the optical fiber F14) is caused in the optical fiber F14 used for the working line, an AIS (Alarm Indication Signal, which is a signal where all bits are "1") is output, and the AIS is detected by the AIS detection circuit 112. Further, an output of the AIS detection circuit 112 is supplied to the path-switch 113, so that the trouble of the working line is confirmed and a selection signal is output to the path-switch 114.

Note that this switching operation is carried out in each of the ADMs 101 to 104, and then a clockwise protection line having the optical fibers F21, F22, F23, F24 is automatically selected and used. Consequently, in the path protection switch ring system, when the working line cannot be used, the protection line is automatically selected and used, so that service can be continued.

As explained above with reference to FIGS. 1 and 2, in the prior art path protection switch ring system, when a fiber is cut by an accident, device-trouble, construction work, and the like, the AIS detection circuit (112) detects a high order alarm signal, and the path-switch automatically selects the other line (protection line), by an emergency method called "1:1".

However, in the above path protection switch ring system, for example, when a line setting operation is not carried out on a node (ADM) of the ring, the line cannot be saved. Namely, for example, an operator forgets a line setting operation or when an unexpected situation is occurred, the path-switch 114 does not operate, and thereby the line cannot be saved.

Below, embodiments of a path protection switch ring system according to the present invention will be explained with reference to FIGS. 3 and 4.

Figure 3:
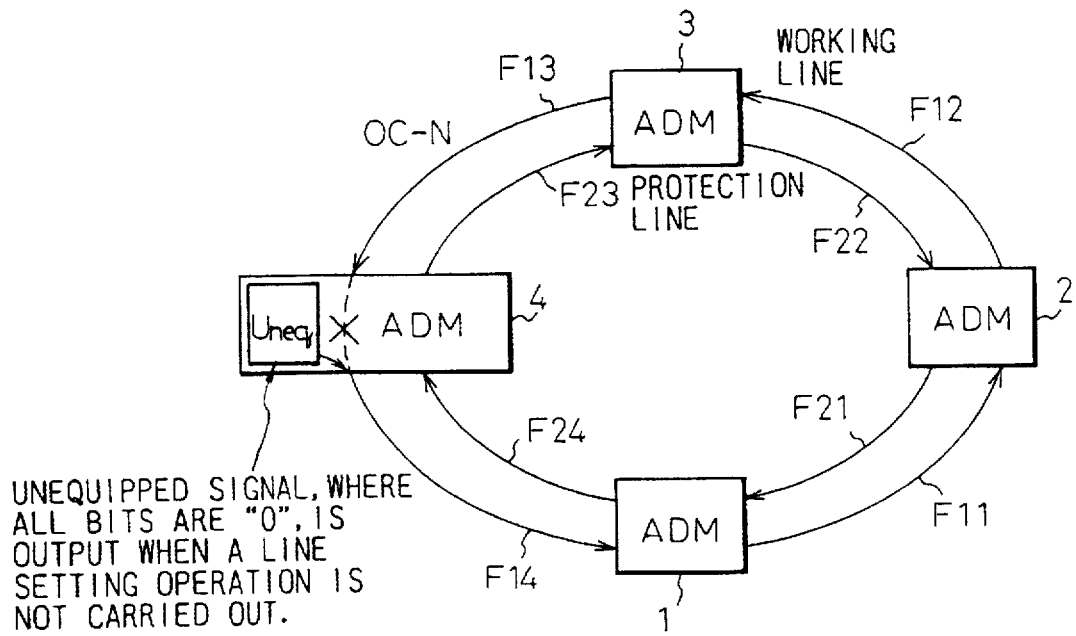
FIG. 3 is a diagram schematically showing an example of a path protection switch ring system in a SONET using the present invention.

FIG. 3 shows an example of a path protection switch ring system in a SONET using the present invention. In FIG. 3, reference numerals 1, 2, 3, and 4 denote ADMs (add/drop multiplexers) corresponding to nodes, F11, F12, F13, and F14 denote working optical fibers, and F21, F22, F23, and F24 denote protection optical fibers.

As shown in FIG. 3, for example, the path protection switch ring system comprises an anticlockwise working line and a clockwise protection line. The working line is constituted by connecting the ADMs 1, 2, 3, 4 and the optical fibers F11, F12, F13, F14, and the protection line is constituted by connecting the ADMs 1, 2, 3, 4 and the optical fibers F21, F22, F23, F24. Note that, in the path protection switch ring system, the anticlockwise working line is generally used. Further, in the ADM (4) where a line setting operation is not carried out, an unequipped signal (unequipped code: which is a signal where all bits are "0") is output.

Figure 4:
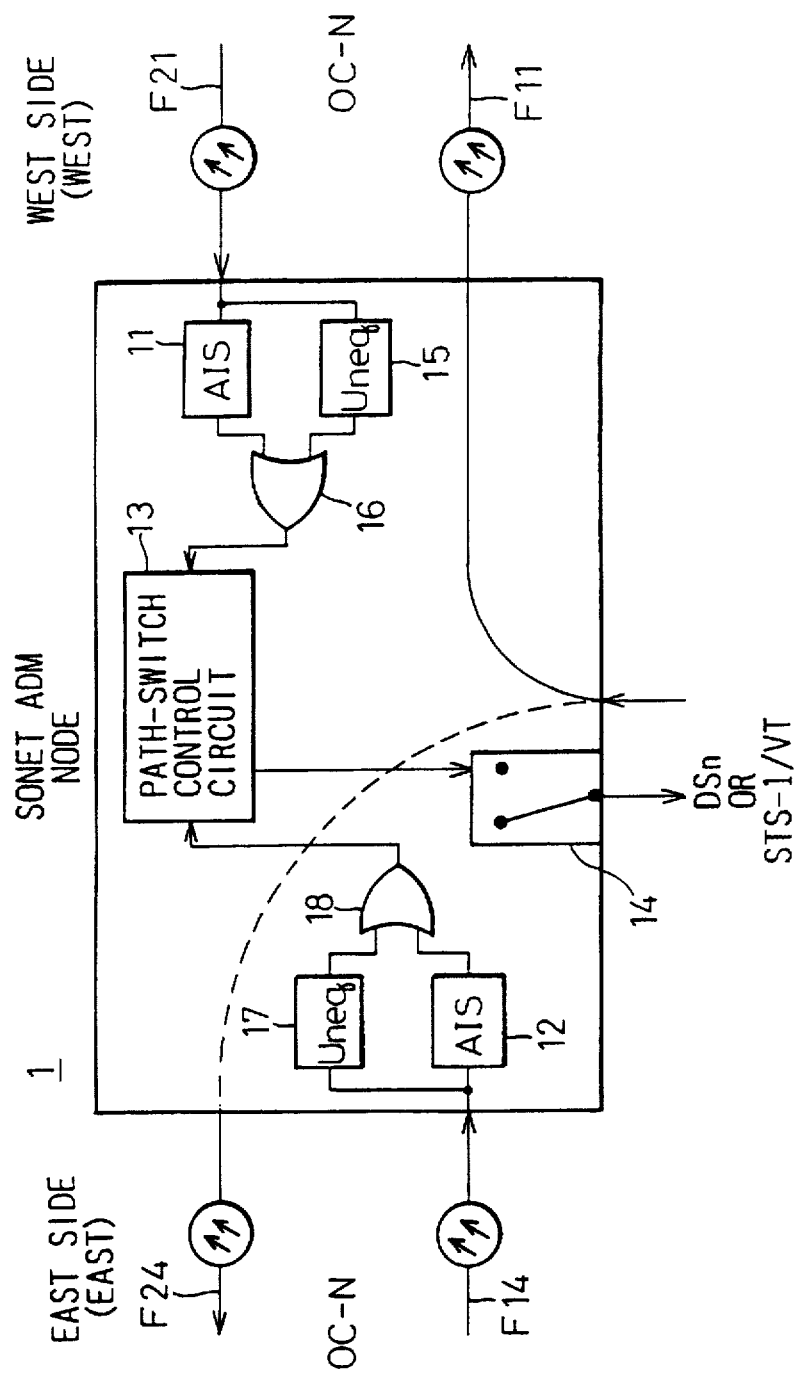
FIG. 4 is a block diagram schematically showing an embodiment of a configuration of an ADM in order to explain the operation of the path protection switch ring system shown in FIG. 3.

FIG. 4 shows an embodiment of a configuration of an ADM in order to explain the operation of the path protection switch ring system shown in FIG. 3. In FIG. 4, reference numerals 11 and 12 denote AIS detection circuits, 13 denotes a path-switch control circuit, 14 denotes a path-switch, 15, 17 denote unequipped signal detection circuits, and 16, 18 denote OR gates.

The AIS detection circuits 11 and 12 are used to detect an AIS (Alarm Indication Signal: concretely, which is a signal where all bits are "1") which is output when a fiber of the working line is cut by an accident, device-trouble, construction work, and the like, that is, the AIS detection circuits 11 and 12 are used to detect a high order alarm signal. The unequipped signal detection circuits 15 and 17 are used to detect an unequipped signal (unequipped code: which is a signal where all bits are "0") which is output when a line setting operation is not carried out. Note that these AIS detection circuits 11, 12 and the unequipped signal detection circuits 15, 17 are provided for both east side (EAST) and west side (WEST) of each ADM, respectively.

Outputs of the AIS detection circuit 12 and the unequipped signal detection circuit 17 of the east side are supplied to the OR gate 18 in order to obtain a logical sum thereof, and an output of the OR gate 18 is supplied to the path-switch control circuit 13. Similarly, outputs of the AIS detection circuit 11 and the unequipped signal detection circuit 15 of the west side are supplied to the OR gate 16 in order to obtain a logical sum thereof, and an output of the OR gate 16 is supplied to the path-switch control circuit 13.

In the present embodiment, the unequipped signal detection circuits 15, 17 and the OR gates 16, 18 are additionally provided to the prior path-switch circuits (111, 112, 113, 114) shown in FIG. 2. In the present embodiment, when the AIS is detected by the AIS detection circuit 12 (11) or the unequipped signal is detected by the unequipped signal detection circuit 17 (15), the path-switch 14 is changed, and thereby, the working line is switched to the protection line. Concretely, for example, when the optical fiber F14 is cut, the AIS is detected by the AIS detection circuit 12, the path-switch 14 is changed through the OR gate 18 and the path-switch control circuit 13.

Further, for example, when a line setting operation is not carried out in the ADM 4, the unequipped signal is detected by the unequipped signal detection circuit 17, the path-switch 14 is changed through the OR gate 18 and the path-switch control circuit 13. Therefore, in the above both cases, the anticlockwise working line constituted by connecting the ADMs 1, 2, 3, 4 and the optical fibers F11, F12, F13, F14 is changed to the clockwise protection line constituted by connecting the ADMs 1, 2, 3, 4 and the optical fibers F21, F22, F23, F24. Note that, in normal condition, the AIS is not detected by the AIS detection circuits 11, 12, and further, the unequipped signal is not detected by the unequipped signal detection circuits 15, 16, so that the changing operation of the path-switch is not carried out.

In the above descriptions, the path-switch circuits (11 to 18) may be provided for each STS path (Synchronous Transport Signal Path: for example, a signal path using about 50 MHz) and VT path (Virtual Tributary Path: for example, a signal path using about 1.5 MHz), respectively. In this case, a STS path unequipped signal is detected by the unequipped signal detection circuits (15, 17) of the STS path-switch circuit, and a VT path unequipped signal is detected by the unequipped signal detection circuits (15, 17) of the VT path-switch circuit.

As described above, according to a path protection switch ring system of the present invention, a service can be continuously carried out without stopping the system by automatically switching a working line to a protection line, even when an operator forgets a line setting operation or when an unexpected situation occurs.

Many different embodiments of the present invention may be constructed without departing from the spirit and scope of the present invention, and it should be understood that the present invention is not limited to the specific embodiments described in this specification, except as defined in the appended claims.

We claim:

1. A path protection switch ring system having a working line, a protection line, and a plurality of add/drop multiplexers, the same signals being transmitted on said working line and said protection line, wherein each said add/drop multiplexer comprises:

path-switch means for switching between said working line and said protection line;

unequipped signal detection means for detecting an unequipped signal which is included in an input signal from one of said working line and said protection line and is output in a transmission when a normal operator input is not carried out; and path-switch control means for controlling the switching operation of said path-switch means when the unequipped signal is detected.

2. A path protection switch ring system as claimed in claim 1, wherein said path protection switch ring system is used in a synchronous optical network or a synchronous digital hierarchy network.

3. A path protection switch ring system as claimed in claim 1, wherein said add/drop multiplexers have respective east and west sides and said unequipped signal detection means is provided on the east sides and on the west sides of said add/drop multiplexers, respectively.

4. A path protection switch ring system as claimed in claim 1, wherein said add/drop multiplexer further comprises an alarm indication signal detection means for detecting an alarm indication signal which is output in said switch ring system when a trouble occurs on one of said working line and said protection line.

5. A path protection switch ring system as claimed in claim 4, wherein said add/drop multiplexers have respective east and west sides and said alarm indication signal detection means is provided for each east and west side of said add/drop multiplexers, respectively.

6. A path protection switch ring system as claimed in claim 5, wherein said unequipped signal detection means is provided in parallel with said alarm indication signal detection means, and said path-switch control means is controlled by the logical sum of outputs of said unequipped signal detection means and said alarm indication signal detection means.

7. A path protection switch ring system as claimed in claim 1, wherein said path-switch control means is determined to be a synchronous transport signal path-switch circuit, and said unequipped signal detection means detects a synchronous transport signal path unequipped signal.

8. A path protection switch ring system as claimed in claim 1, wherein said path-switch control means is determined to be a virtual tributary path-switch circuit, and said unequipped signal detection means detects a virtual tributary path unequipped signal.

9. A line saving method for a path protection switch ring system having a working line, a protection line, and a plurality of add/drop multiplexers having respective east and west sides, the same signals being transmitted on said working line and said protection line, wherein said line saving method comprises the steps of:

detecting an unequipped signal which is output when a line setting is not carried out; and changing from said working line to said protection line when the unequipped signal is detected.

10. A line saving method for a path protection switch ring system as claimed in claim 9, wherein said path protection switch ring system comprises a working line, a protection line, and a plurality of add/drop multiplexers, wherein each said add/drop multiplexer includes:

a path-switch means for switching between said working line and said protection line;

an unequipped signal detection means for detecting an unequipped signal which is output when a line setting is not carried out; and a path-switch control means for controlling the switching operation of said path-switch means when the unequipped signal is detected.

11. A line saving method for a path protection switch ring system as claimed in claim 10, wherein said path protection switch ring system is used in one of a synchronous optical network and a synchronous digital hierarchy network.

12. A line saving method for a path protection switch ring system as claimed in claim 10, wherein said unequipped signal detection means is provided for each east and west side of said add/drop multiplexer, respectively.

13. A line saving method for a path protection switch ring system as claimed in claim 10, wherein said add/drop multiplexer further comprises an alarm indication signal detection means for detecting an alarm indication signal which is output when a trouble occurs on one of said working line and said protection line.

14. A line saving method for a path protection switch ring system as claimed in claim 13, wherein said alarm indication signal detection means is provided for each east and west side of said add/drop multiplexer, respectively.

15. A line saving method for a path protection switch ring system as claimed in claim 14, wherein said unequipped signal detection means is provided in parallel with said alarm indication signal detection means, and said path-switch control means is controlled by the logical sum of outputs of said unequipped signal detection means and said alarm indication signal detection means.

16. A line saving method for a path protection switch ring system as claimed in claim 10, wherein said path-switch control means is determined to be a synchronous transport signal path-switch circuit, and said unequipped signal detection means detects a synchronous transport signal path unequipped signal.

17. A line saving method for a path protection switch ring system as claimed in claim 10, wherein said path-switch control means is determined to be a virtual tributary path-switch circuit, and said unequipped signal detection means detects a virtual tributary path unequipped signal.

* * * * *